United States Patent
Brandenburger

(10) Patent No.: US 10,278,896 B2
(45) Date of Patent: May 7, 2019

(54) AMPOULE FOR A MEDICAL LIQUID, AND METHOD FOR PRODUCING AN AMPOULE

(71) Applicant: Fresenius Kabi Deutschland GmbH, Bad Homburg (DE)

(72) Inventor: Torsten Brandenburger, Reichelsheim (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 621 days.

(21) Appl. No.: 14/905,514

(22) PCT Filed: Jul. 15, 2014

(86) PCT No.: PCT/EP2014/065077
§ 371 (c)(1),
(2) Date: Jan. 15, 2016

(87) PCT Pub. No.: WO2015/007703
PCT Pub. Date: Jan. 22, 2015

(65) Prior Publication Data
US 2016/0151240 A1    Jun. 2, 2016

(30) Foreign Application Priority Data
Jul. 16, 2013 (EP) .................... 13176663

(51) Int. Cl.
*A61J 1/20* (2006.01)
*A61J 1/06* (2006.01)
(Continued)

(52) U.S. Cl.
CPC .............. *A61J 1/2048* (2015.05); *A61J 1/067* (2013.01); *B29C 45/14* (2013.01); *B32B 37/12* (2013.01);
(Continued)

(58) Field of Classification Search
CPC ........ A61J 1/067; A61J 1/1412; A61J 1/2048; A61J 1/2089; A61J 1/2096; A61J 1/1425;
(Continued)

(56) References Cited

U.S. PATENT DOCUMENTS 4,492,313 A * 1/1985 Touzani ............... B65D 1/0292
215/372
4,854,458 A * 8/1989 Differ .................. B65D 1/0238
215/253

(Continued)

FOREIGN PATENT DOCUMENTS

CN     102164628    8/2011
TW       503105     9/2002
(Continued)

*Primary Examiner* — Adam Marcetich
(74) *Attorney, Agent, or Firm* — Occhiuti & Rohlicek LLP

(57) ABSTRACT

An ampoule for a medical liquid, comprising an ampoule body for receiving a medical liquid and a connection part for connecting a removal device to the ampoule. The ampoule body is produced as a plastic injection-molded part by means of a plastic injection molding process. In this manner an ampoule is provided which allows a simple and inexpensive production of the ampoule and can ensure a sterile storage of medical liquids.

16 Claims, 6 Drawing Sheets

(51) Int. Cl.
  *B29C 45/14* (2006.01)
  *B32B 37/12* (2006.01)
  *A61J 1/14* (2006.01)
  *B29L 31/00* (2006.01)

(52) U.S. Cl.
  CPC ............ *A61J 1/1412* (2013.01); *A61J 1/2089* (2013.01); *B29L 2031/753* (2013.01); *B32B 2250/02* (2013.01)

(58) Field of Classification Search
  CPC .. A61J 1/1431; B29C 45/14; B29L 2031/753; B32B 2250/02; B32B 37/12; B65D 1/0238; B65D 1/0292; B65D 1/095; B65D 1/09; B65D 2101/0023
  See application file for complete search history.

(56) References Cited

U.S. PATENT DOCUMENTS

| | | | | |
|---|---|---|---|---|
| 5,035,689 | A * | 7/1991 | Schroeder | A61J 1/067 141/2 |
| 5,261,881 | A * | 11/1993 | Riner | A61M 5/282 128/919 |
| 6,918,418 | B1 * | 7/2005 | Farris | A61J 1/067 141/27 |
| 2004/0004082 | A1 * | 1/2004 | Lee | B65D 1/0292 220/703 |
| 2006/0046006 | A1 * | 3/2006 | Bastion | B32B 27/36 428/35.2 |
| 2006/0188676 | A1 * | 8/2006 | Dambricourt | B29C 45/36 428/35.2 |
| 2006/0282061 | A1 * | 12/2006 | Domkowski | A61J 1/10 604/408 |
| 2007/0190275 | A1 * | 8/2007 | Helmenstein | B29C 45/0055 428/35.7 |
| 2007/0284330 | A1 * | 12/2007 | Finneran | B65D 11/04 215/43 |
| 2008/0009783 | A1 * | 1/2008 | Branderburger | A61M 39/20 604/30 |
| 2009/0270832 | A1 * | 10/2009 | Vancaillie | A61J 1/1475 604/408 |
| 2011/0284557 | A1 * | 11/2011 | Hayakawa | B05B 11/3047 220/601 |

FOREIGN PATENT DOCUMENTS

| | | |
|---|---|---|
| WO | 2002/000160 | 1/2002 |
| WO | 2011/001275 | 1/2011 |

* cited by examiner

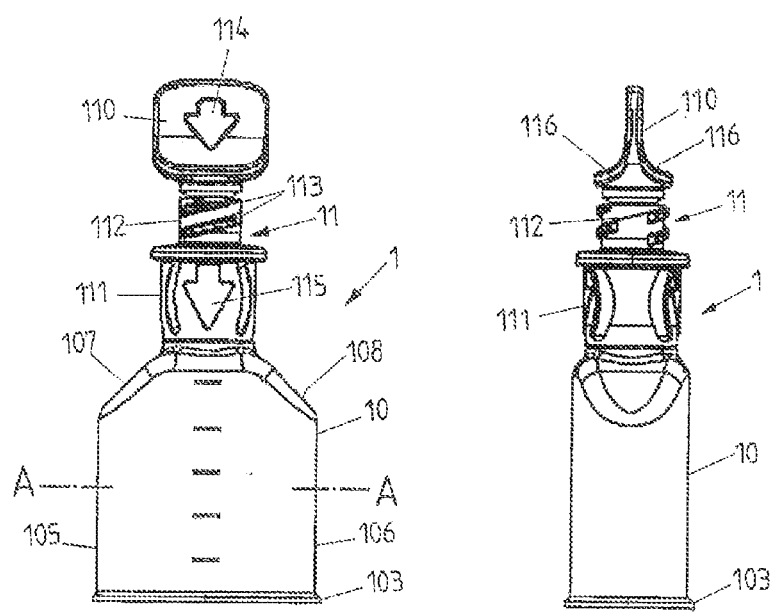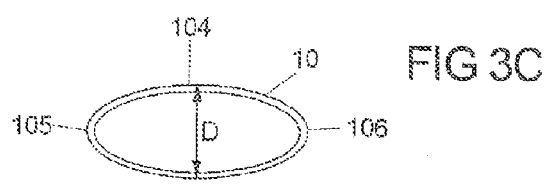

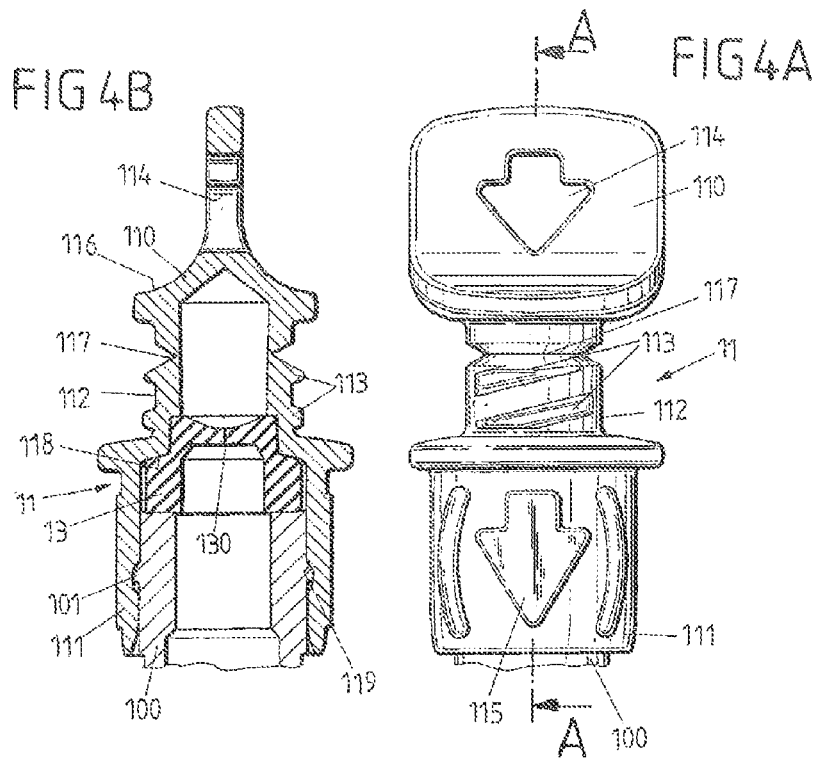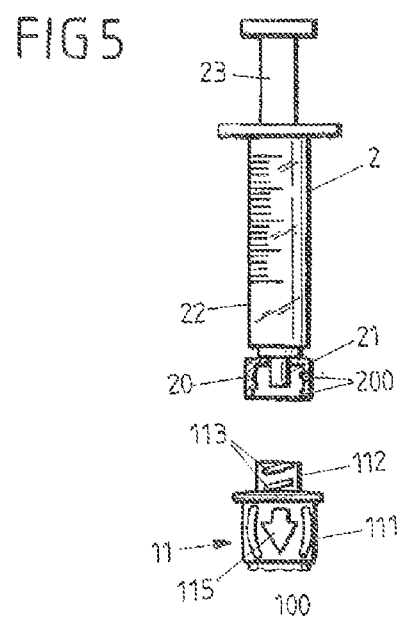

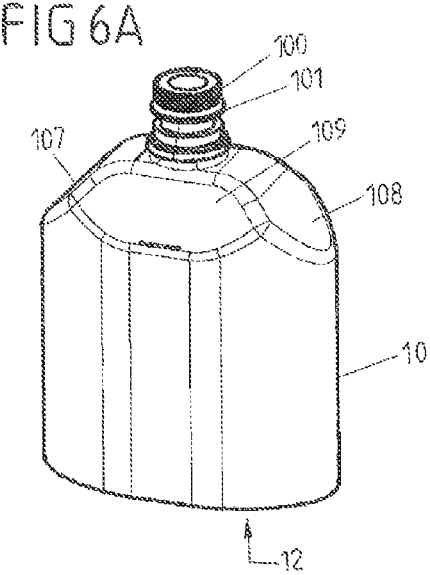
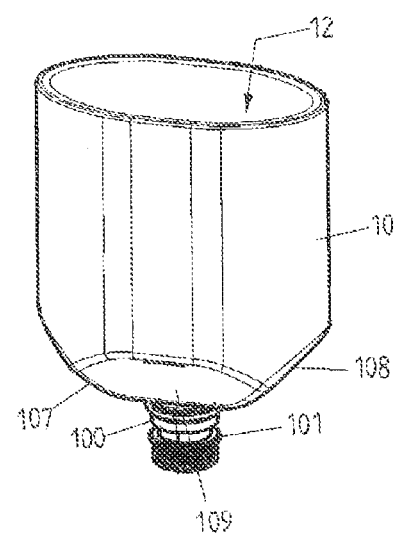

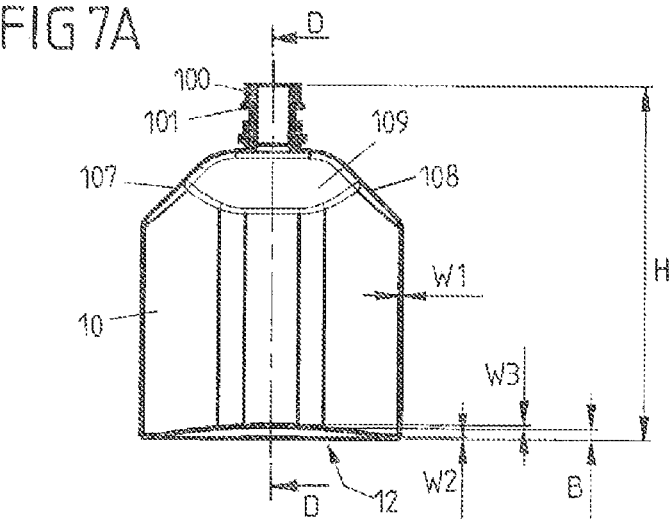
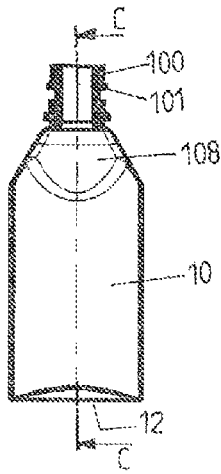
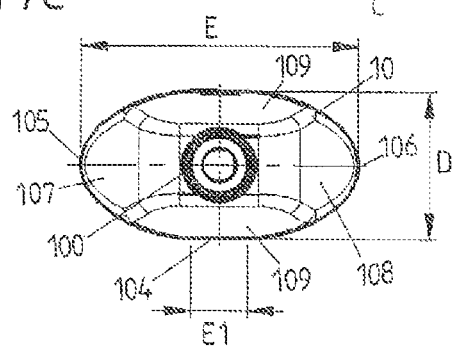

AMPOULE FOR A MEDICAL LIQUID, AND METHOD FOR PRODUCING AN AMPOULE

CROSS REFERENCE TO RELATED APPLICATIONS

This application is a National Stage of International Application No. PCT/EP2014/065077 filed on Jul. 15, 2014, which claims priority to European Application No. 13176663.6 filed on Jul. 16, 2013, the contents of which are hereby incorporated by reference in their entirety.

The invention relates to an ampoule for a medical liquid according to the preamble of claim 1, and to a method for producing an ampoule for a medical liquid.

An ampoule of this kind comprises an ampoule body for receiving a medical liquid, for example an infusion solution, and a connection part for connecting a removal device, e.g. a syringe, to the ampoule.

An ampoule of this kind serves, for example, for the storage of a medical active substance, in particular a medicament, or another liquid used for medical purposes, for example magnesium, calcium chloride, potassium chloride, sodium chloride, glucose, sterile water, nutrients for parenteral nutrition, or similar.

Such ampoules, as are known from U.S. Pat. No. 4,671,763 and from WO 2011/075798 A1 for example, are nowadays usually produced using the blow-fill-seal (BFS) process if they are made from plastic. The blow-fill-seal process is one that is used in particular for producing containers for receiving liquids. In the blow-fill-seal process, a container is formed, filled and closed in a continuous process, in an optionally sterile, closed environment within a machine, without the need for an intervention on the part of an operator. In the context of the blow-fill-seal process, a plastic is generally extruded vertically in order to produce a tubular portion which is then shaped in a mold and filled and then closed. By virtue of the container being shaped in a sterile environment, the blow-fill-seal process is suitable in particular for the production of ampoules for storing medical liquids.

Conventional ampoules often have no base surface on which they could be stood. Moreover, when a liquid is removed from conventional ampoules, a reverse pumping action may take place, which is caused by the restoring of the walls of the ampoule body and leads to liquid being sucked back into the ampoule.

The object of the present invention is to make available an ampoule and a method for producing an ampoule, thereby permitting simple, cost-effective production of the ampoule and ensuring sterile storage of a medical liquid.

This object is achieved by subject matter having the features of claim 1.

Accordingly, the ampoule body is produced as a plastic injection-molded part by means of plastic injection molding.

Plastic injection molding is understood as a primary forming method in which a plastic is plasticized with an injection molding tool in an injection unit and is injected into an injection mould. A cavity provided in the injection mold here determines the shape and surface structure of the shaped part that is produced. It is possible for shaped parts to be produced in an exact manner with fine structures. In particular, the ampoule body has substantially no flash on the outside, in contrast to known ampoules produced by the blow-fill-seal process.

By virtue of the fact that the ampoule is not now produced by means of a blow-fill-seal process, and instead the ampoule body is shaped by means of injection molding, it is possible to produce an ampoule with advantageous properties. By means of injection molding, the ampoule body can also be very accurately produced with very thin walls so that the ampoule body is easily collapsible, this being associated with a low degree of restoring after removal of liquid, such that a reverse pumping action, if such in fact takes place, is at least reduced.

The ampoule is preferably of a multi-part construction, with the connection part being joined as a separate part to the ampoule body. Here, the ampoule body is produced as a plastic injection-molded part and, similarly, the connection part can also be produced by plastic injection molding, but with the connection part and the ampoule body being designed as separate parts and with the connection part being joined to the ampoule body to make available the ampoule. In an assembled state, the connection part can then be held with a form fit, for example, on a neck of the ampoule body, such that the connection part is rigidly connected to the ampoule body and is secured in a leaktight manner on the ampoule body.

In an advantageous embodiment, the connection part has a threaded segment with at least one thread turn for producing a threaded connection to a removal device, and a break-off piece connected to the threaded segment.

The threaded segment can, for example, provide a Luer attachment by means of which the connection part can be connected in the manner of a so-called Luer lock to a removal device, for example a syringe. For this purpose, the removal device can have a connection element in the form of a sleeve nut with an internal thread that can be brought into threaded engagement with the threaded segment, such that the removal device can be connected releasably to the ampoule via the threaded segment.

In a state when connected to the threaded segment, the break-off piece serves to close an opening of the ampoule body in a leaktight manner. To free the opening, the break-off piece can be removed from the threaded segment, in particular broken off, for which purpose a defined predetermined breaking point can be provided between the break-off piece and the threaded segment, at which predetermined breaking point the break-off piece can be separated in a defined manner from the threaded segment. With the break-off piece broken off, the opening of the ampoule body is then freed, such that access can be made to a liquid in the ampoule. Moreover, with the break-off piece broken off, the threaded segment can be connected to a removal device such that the liquid can be removed from the ampoule via the removal device, for example a syringe.

As has been stated, the connection part can be designed as a separate part and mounted onto a neck of the ampoule body. In order to ensure that a transition between the connection part and the ampoule body is sealed off in a leaktight manner, a membrane element can be provided which is held clamped between the connection part and the ampoule body and which is preferably designed in such a way that removal of liquid from the ampoule is possible only by means of a suitable removal device but, after the break-off piece has been broken off, liquid can readily run out of the ampoule. The membrane is in particular a reclosable membrane. In the manner of a valve for example, the membrane element can have an opening which opens when a suction force is applied by the removal device and thus allows liquid to emerge from the ampoule into the removal device, for example into a syringe, but which is closed when no such suction force is applied, such that no liquid can emerge from the ampoule. As an alternative or in addition, the membrane can be opened by the removal device, for example by the tip of a needleless syringe, by means of the removal device at least locally piercing the membrane and/or by means of the removal device at least locally deforming the membrane.

The ampoule body produced by plastic injection molding preferably has thin walls and is thus flexible, in such a way that it is readily collapsible, in particular without any great force, when a medical liquid is removed from the ampoule body. On account of the flexibility and collapsibility of the ampoule body, the restoring forces acting on the walls of the ampoule body are also low, such that the ampoule can have a minimal reverse pumping action and, in this way, there is minimal risk of a removed liquid being sucked back into the ampoule. In one embodiment, the wall thickness (W1) of the walls of the ampoule body is less than or equal to 0.5 mm. For example, the wall thickness is in a range from 0.01 mm to less than 0.5 mm.

The ampoule body is produced as an injection-molded part and carries the connection part. On a side facing way from the connection part, the ampoule body can have a base element which, for example as a separate element, can be joined to the ampoule body, in particular by means of a cohesively bonded connection. In this sense, the base element can be designed, for example, as a film which is adhesively bonded or welded to the ampoule body and thus closes the ampoule body, in the base area thereof, in a leaktight manner.

By virtue of the fact that the ampoule body is closed by a separate base element, it is possible to introduce liquid into the ampoule body via the base before the base is closed and then to connect the base element, for example a film, to the ampoule body, in particular by adhesive bonding or welding. In an alternative filling method, it is of course also possible first of all to close the base of the ampoule body by means of a suitable base element, for example by means of a film, and only then to fill the ampoule body via an opening on the neck of the ampoule body to be connected to the connection part.

In another variant, the base element can also be produced in one piece with the ampoule body by means of plastic injection molding and blowing. The ampoule body, together with its base element, is thus produced in one piece in a suitable injection molding tool, such that the shaped part obtained after the injection molding makes available an ampoule body which is closed except for an opening on the neck of the ampoule body and which, after the filling procedure, can thus be easily completed by attachment of the connection part.

In an advantageous embodiment, the base element arches into the ampoule body. The base element thus has an arch which faces into the interior of the ampoule body, such that the base element is at least in part set back from an outer edge of the ampoule body adjoining the base element. This has the effect that the ampoule body can have a high degree of stability, by means of the ampoule body being able to be set down in particular on its lower, outer edge. The lower, outer edge of the ampoule body thus provides a defined standing surface on which the ampoule body can stand steadily.

Moreover, in the area of the lower, outer edge of the ampoule body, in the area of the base element, a stand ring can be applied which preferably protrudes radially outward from the ampoule body, although it can also protrude radially inward, and thus widens the standing surface at the bottom of the ampoule body. Moreover, by way of such a stand ring, a reliable adhesively bonded or welded connection of a base element, particularly in the form of a film, to the ampoule body can be produced, wherein such a stand ring can also provide a reliable contact for a welding tool, by means of which a defined welding of a film onto the stand ring of the ampoule body is made possible.

In a further embodiment, the ampoule body can also have a coating which, for example, serves to provide an oxygen barrier. Such a coating can be applied, for example, to an inner face or an outer face of the ampoule body and can be produced, for example, using substances such as metallocenes, EVOH or an oxide (e.g. SiOx).

Instead of applying a coating to the ampoule body, it is also possible that a suitable substance which can provide a desired barrier, in particular an oxygen barrier, is already incorporated in the material of the ampoule body, such that the actual ampoule body produced by means of plastic injection molding has suitable barrier properties itself.

As an alternative to this, it is also possible for an ampoule of the type described here to be introduced into oxygen-tight external packaging, such that an oxygen barrier is provided via such external packaging.

In terms of its shape, the ampoule body is preferably adapted such that it can collapse in a suitable manner. For this purpose, the ampoule body can for example have in cross section the form of a small ship (what is called a ship-shape body), since the ampoule body, in cross section in a central portion, has a maximum ampoule breadth which, starting from the central portion, narrows on both sides toward both ends of the ampoule body, in such a way the ampoule body, starting from the central portion, thus tapers toward both ends substantially to a point. This corresponds approximately to the shape of a ship's hull, hence the expression ship-shape body. Reference is made here to a cross section transverse to an attachment direction along which the connection part is joined to the ampoule body. The ampoule body is preferably mirror-symmetrical with respect to two planes of mirror symmetry. The cross-sectional plane of the cross section in question here is perpendicular to the two planes of mirror symmetry.

In a further embodiment of the ampoule, the ampoule body, in a transition area to the neck of the ampoule body, has beveled shoulders on at least two opposite sides. Preferably, these are the sides of longer extent which provide the ampoule width E. Preferably, the ampoule body, in the transition area to the neck of the ampoule body, has beveled shoulders on all four sides. The collapsibility of the ampoule body, upon removal of liquid, is improved by the shoulders. In one embodiment, the shoulders extend at an angle of ca. 30° to 60°, in particular of 40° to 50°, to a plane of mirror symmetry of the ampoule body. In particular, the shoulders are each provided by a substantially flat plane.

In a further embodiment, the ampoule body has, in a central portion of the ampoule body, a substantially straight portion in the two opposite sides of the ampoule body that provide the ampoule width E. In a plan view of the underside of the ampoule body, the side walls of the ampoule body are therefore not completely curved about the entire circumference of the ampoule body. The straight portions do not extend across the entire ampoule width E. In the vertical direction, the straight portions preferably extend from the stand ring as far as the shoulders. This further improves the collapsibility of the ampoule body when liquid is removed. The straight or substantially straight portion is also referred to below as the flattening.

Ampoules according to the invention preferably have a size for a receiving volume of up to approximately 30 ml. They can be provided in different sizes, for example with a receiving volume of 5 ml, 10 ml, 20 ml or 30 ml. Generally, the overall height H of the ampoule body is less than or equal to 60 mm, the maximum ampoule breadth D of the ampoule body is less than or equal to 25 mm and/or the maximum ampoule width E is less than or equal to 45 mm. In a plan view of the base, the ampoule body is substantially elliptic. The ampoule width E is greater than the ampoule breadth D. Preferably, the ratio D/E lies in a range between 0.33 and 7. This is particularly advantageous for the stability of the ampoule. The ampoule according to the invention has a good surface/volume ratio. This is particularly important for the durability of the content of the ampoule. In one embodiment, the ampoule has a surface/volume ratio of less than 50 $cm^{-1}$, preferably of less than 30 $cm^{-1}$, particularly preferably from greater than or equal to 20 $cm^{-1}$ to less than or equal to 30 $cm^{-1}$.

The object is also achieved by a method for producing an ampoule for a medical liquid. The ampoule has an ampoule body for receiving a medical liquid, and a connection part for connecting a removal device to the ampoule. Provision is made that the ampoule body is produced as a plastic injection-molded part by means of plastic injection molding.

For advantages and advantageous embodiments, reference should be made to the above description of the ampoule, which description also applies analogously to the method.

The ampoule body is produced from plastic, for example from polymers or copolymers or also synthetic rubber. The plastic is preferably weldable. For example, the ampoule body can be produced from a polypropylene or polyethylene, or the ampoule body can be made from a copolymer using monomers such as propylene, ethylene, butylene, butadiene, styrene and/or isoprene. The plastic of the ampoule body is preferably transparent.

The film used to close a base of the ampoule body can be a weldable film, for example. In one embodiment, the film is based on homo-polypropylene and/or co-polypropylene with fractions of a thermoplastic polymer, for example SEBS and/or SIS. In one embodiment, the film has multiple plies.

A membrane for sealing a transition between the connection part and the ampoule body can be made of polyisoprene, for example.

The connection part can also be produced as an injection-molded part by means of injection molding, for which purpose plastics such as polymers and copolymers can be used. For example, polypropylene or a thermoplastic elastomer can be used. Or it is possible to use a copolymer using monomers such as propylene, ethylene, butadiene, styrene and/or isoprene.

Preferably, the plastic of the connection part is not transparent. The connection part can have an overall height of 1 cm to 5 cm. The attachment piece of the connection part can have a height of 0.1 cm to 2 cm and/or a breadth of 0.2 cm to 1.5 cm. The threaded segment of the connection part can have a height of 0.2 cm to 1 cm. The break-off piece of the connection part can have a height of 0.2 cm to 2 cm.

The underlying concept of the invention is explained in more detail below on the basis of the illustrative embodiments shown in the figures, in which:

FIG. 3A shows a front view of the ampoule;

FIG. 3B shows a side view of the ampoule;

FIG. 3C shows a sectional view through the ampoule along the line A-A in FIG. 3A;

FIG. 4A shows a view of a connection part;

FIG. 4B shows a sectional view of the connection part along the line B-B in FIG. 4A;

FIG. 5 shows a view of a removal device in the form of a syringe before it is joined to the connection part;

FIG. 6A shows a perspective view of an ampoule body in a further illustrative embodiment of an ampoule;

FIG. 6B shows a perspective view of the ampoule body from FIG. 6A, obliquely from below;

FIG. 7A shows a sectional view of the ampoule body along the line C-C in FIG. 7B;

FIG. 7B shows a sectional view of the ampoule body along the line D-D in FIG. 7A;

FIG. 7C shows a view of the ampoule body from above; and

Figure 1A:
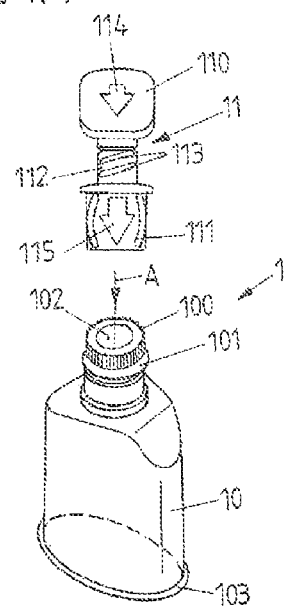
FIG. 1A shows a view of an ampoule with an ampoule body and a connection part in a separated state.
Figure 1B:
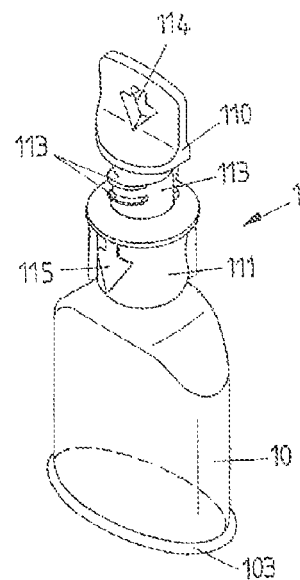
FIG. 1B shows a view of the ampoule with the connection part joined to the ampoule body.

FIGS. 1A and 1B to FIG. 5 show a first illustrative embodiment of an ampoule 1 with an ampoule body 10 for receiving a medical liquid, and with a connection part 11 for permitting access to the interior of the ampoule body 10 and to a medical liquid contained therein.

The ampoule body 10 has a neck 100 with an opening 102 and with a locking projection 101. The connection part 11 is to be mounted onto the neck 100 with an attachment piece 111 and, in the mounted state (see, for example, FIG. 1B and FIG. 4B), the locking projection 101 of the neck 100 engages with a form fit in a locking recess 119 in the form of a groove-shaped depression on the inner face of the attachment piece 111. The locking projection 101 of the neck 100 has a height of 0.01 mm to 3 mm (in the direction of the longitudinal axis of the ampoule 1). The depression under the locking projection 101 can have a height of 0.05 mm to 4 mm (in the direction of the longitudinal axis of the ampoule 1). The grooves at the upper end of the neck 100, which in this case are preferably vertical, act in particular as an anti-rotation means for the connection part 11 to be mounted thereon.

The attachment piece 111 of the connection part 11 is adjoined by a threaded segment 112 which has two thread turns 113 for providing a Luer attachment. A break-off piece 110 is connected to the threaded segment 112 via a predetermined breaking point 117 (see FIG. 4A) and can be separated from the threaded segment 112 along the predetermined breaking point 117. The connection part 11 with its attachment piece 111, the threaded segment 112 and the break-off piece 110 is designed in one piece, wherein, in a starting state, the break-off piece 111 is connected to the threaded segment 112 and, in this way, the connection part 11, when mounted on the neck 100 of the ampoule body 10, closes the opening 102 of the ampoule body 10.

As is shown in FIG. 4B, a membrane element 13 is arranged between the connection part 11 and an upper edge of the neck 100, which membrane element 13 is held clamped between the neck 100 and a surrounding contact portion 118 of the connection part 11 and seals off the transition between the connection part 11 and the neck 100 of the ampoule body 10 in a leaktight manner.

The membrane element 13 has an opening 130 which, in the manner of a valve, closes the opening 102 of the neck 100 in an unloaded state, especially when no suction force acts to remove the medical liquid from the ampoule body 10 or when the membrane element 13 is not pierced, such that liquid cannot immediately escape from the ampoule body 10 when the break-off piece 110 is broken off.

The ampoule body 10 is produced as a plastic injection-molded part in a suitable injection molding tool. The ampoule body 10 is designed with thin walls and, on account of its shaping, is also relatively easily collapsible, such that a liquid can easily be removed from the ampoule body 10 by means of a suitable removal device, for example a syringe 2 shown in FIG. 5.

The ampoule body 10 is mirror-symmetrical with respect to two planes of mirror symmetry which extend parallel to the image planes as per FIGS. 3A and 3B. The ampoule body 10 is configured here in the form of a small ship, i.e. it has what is called a ship-shape body. This is to be understood as meaning that the ampoule body 10, as shown in FIG. 3C in cross section transverse to its planes of mirror symmetry, has a maximum ampoule breadth D in the area of a central portion 104 and, starting from the central portion 104, it narrows on both sides toward ends 105, 106 in such a way that it more or less tapers to a point at the ends 105, 106. As is shown in the figures, the ends 105, 106 are round. By virtue of the fact that the ampoule body 10 additionally has beveled shoulders 107, 108 (see FIG. 3A) in the area of its neck 100, the walls of the ampoule body 10 can be collapsed without great forces having to be applied to do so, and this permits simple, easy removal of a liquid from the ampoule body 10 by means of a suitable removal device 2.

In the illustrative embodiment in FIGS. 1A and 1B to FIG. 5, the ampoule body 10 is closed in the area of its base by a base element 12 in the form of a film. The base element 12, as a separate element, is applied to the ampoule body 10, for example by means of adhesive bonding or welding, wherein the connection of the film-shaped base element 12 to the ampoule body 10 is produced via a radially outwardly projecting stand ring 103 on the lower circumferential edge of the ampoule body 10.

A reliable connection of the film-shaped base element 12 to the ampoule body 10 can thus be produced via the stand ring 103. Moreover, the stand ring 103 provides an advantageous stability of the ampoule 1, since the ampoule 1 is able to stand comparatively secure against tipping on its stand ring 103.

The ampoule body 10, the connection part 11 and the base element 12 are first of all manufactured separately from each other in order to produce the ampoule 1. To fill the latter, the film-shaped base element 12 can first of all be secured on the ampoule body 10, in order then to introduce a medical liquid into the ampoule body 10 through the opening 102 in the neck 100 of the ampoule body 10, and in order thereafter to close the ampoule body 10 in a leaktight manner by attaching the connection part 11 to the neck 100 in an attachment direction A (see FIG. 1A). In the closed state, the ampoule 1 can then be sterilized, for example in an autoclave, at a high temperature, e.g. at a temperature of over 100° C.

In an alternative filling method, the connection part 11 can also first of all be joined to the neck 100 such that the connection part 11 is held with a form fit and in a leaktight manner on the neck 100, after which the ampoule body 10 is then filled via its base, and only then is the base closed by applying the film-shaped base element 12. Sterilization is finally carried out, for example in an autoclave.

The connection part 11, with its threaded segment 112, constitutes a Luer attachment for producing a Luer lock connection to a suitable removal device 2 (see FIG. 5). For this purpose, the threaded segment 112 has one or more thread turns 113 (two thread turns 113 in the illustrative embodiment shown) which, when the break-off piece 110 is broken off, can be brought into threaded engagement with a connection element 20 in the form of a sleeve nut which has a thread groove 200 and which is provided on the removal device 2.

To remove a liquid from the ampoule 1, a user grips the break-off piece 110 between two fingers, wherein grip limiters 116 prevent gripping as far as the threaded segment 112 of the connection part 11 and thus ensure that a user is unable to touch the threaded segment 112 when breaking off the break-off piece 110 and cannot thus gain access to the interior of the ampoule body 10. The break-off piece 110 can be broken off in a defined manner along a predetermined breaking point 117, which is formed by a deliberate notch-shaped weakening of the wall between the break-off piece 110 and the threaded segment 112, such that, after the break-off piece 110 has been broken off, the removal device 2 in the form of the syringe with its connection element 20 can be mounted onto the threaded segment 112 and can be brought into threaded engagement with the threaded segment 112. In doing so, a syringe cone 21 is inserted into the interior of the threaded segment 112 and comes into contact sealingly with the threaded segment 112. By withdrawing a plunger 23 of the removal device 2, liquid can then be sucked out of the ampoule 1 into a syringe body 22 of the removal device 2.

By withdrawing the plunger 23, a suction force for removing the liquid from the ampoule 1 can be made available at the opening 102, which suction force also has the effect that the opening 130 of the membrane element 13 opens in the manner of a valve and, as a result, liquid is able to pass through the membrane element 13. As an alternative, the syringe tip can also open the membrane by piercing the latter.

Indicator elements in the form of a cutout (indicator element 114) or in the form of an elevation (indicator element 115) and in the form of arrows are arranged on the break-off piece 110 and on the attachment piece 111. In the figures, the arrows are shown, by way of example, pointing in the direction of the ampoule body 10. However, the arrows can also point in the opposite direction, although this is not shown in the figures.

In a further illustrative embodiment, shown in FIGS. 6A, 6B, 7A, 7B and 7C, the ampoule body 10 is produced in one piece with the base element 12 by using an injection molding process. The ampoule body 10 and the base element 12 are thus produced in one piece in the same injection molding tool, which means that an additional production step for connecting the base element 12 to the ampoule body 10 is not needed.

As will be seen from the sectional views in FIGS. 7A and 7B, the base element 12 arches into the interior of the ampoule body 10, such that a stand ring is made available at the transition between the base element 12 and the walls of the ampoule body 10, which stand ring provides a stand surface on which the ampoule body 10 is able to reliably stand in a manner relatively secure against tipping over.

In terms of its shape and function, the ampoule body 10 is otherwise comparable to the illustrative embodiment described on the basis of FIGS. 1A and 1B to FIG. 5, and so reference should be made to the explanations given above.

The ampoule body 10 of the illustrative embodiment according to FIGS. 6A, 6B, 7A, 7B and 7C is moreover connected to a connection part 11 of the kind described on the basis of FIGS. 4A, 4B and 5, and so reference should also be made in this respect to the explanations given above.

In the illustrative embodiment according to FIGS. 6A, 6B, 7A, 7B and 7C, the ampoule body 10 is flattened in the area of its central portion 104, as can be seen in particular from the plan view in FIG. 7C. Moreover, in addition to the shoulders 107, 108, which adjoin the narrow-side ends 105, 106 of the ampoule body 10, further shoulders 109 are provided, with which the ampoule body is also beveled on its broad sides toward the neck 100. By means of the shoulders 107, 108 and 109, a transition, tapering toward the neck 100, can be created from the ship shape of the ampoule body 10 to the substantially cylindrically extending neck 100.

The shoulders 107, 108 and 109 also contribute to an advantageous collapsibility of the ampoule body 10. The shoulders 107, 108 and 109 each extend at an angle of ca. 30° to 60°, e.g. ca. 45°, with respect to a plane of mirror symmetry of the ampoule body 10.

Figure 8:
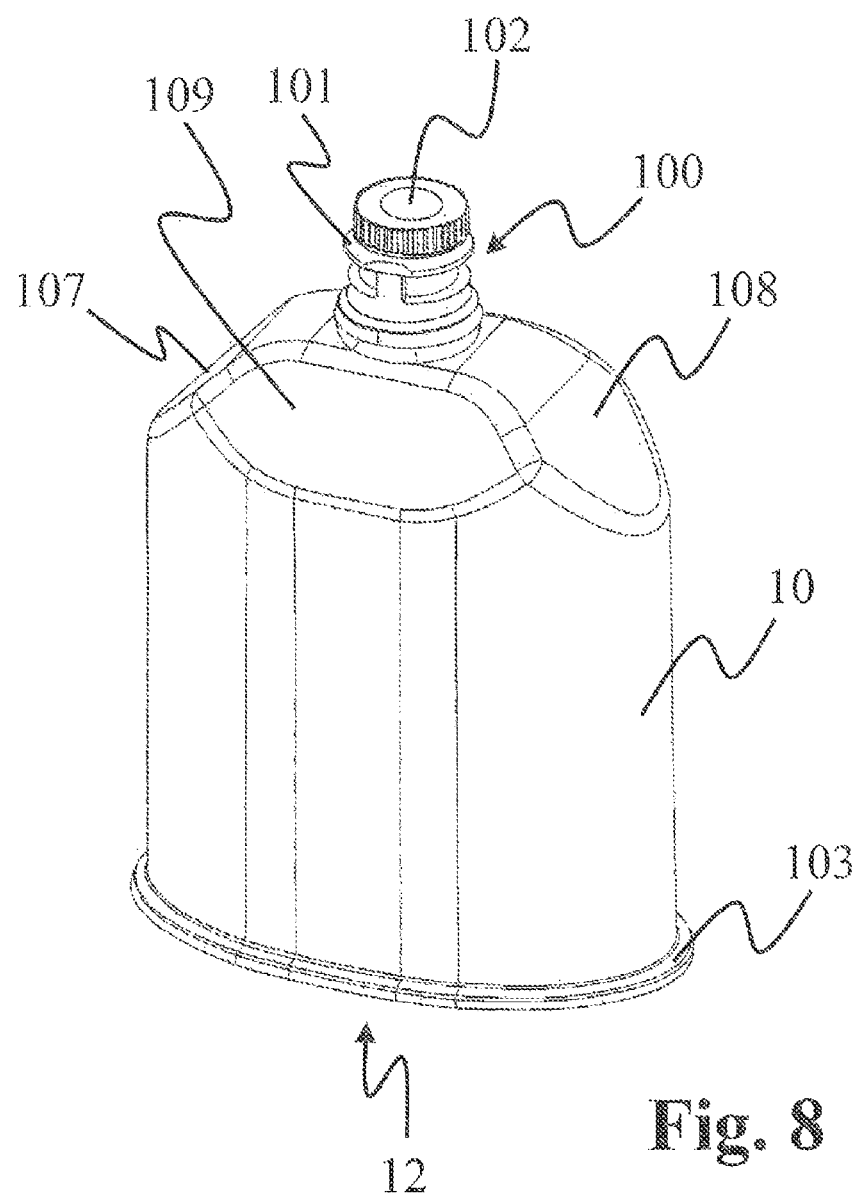
FIG. 8 shows a perspective view of an ampoule body in a further illustrative embodiment of an ampoule.

FIG. 8 shows a further embodiment of an ampoule 1. This ampoule 1 largely corresponds to the embodiment shown in FIGS. 6A to 7C, and so reference is made in this connection to the explanations given above, but with the difference that this ampoule 1 here has a stand ring 103 lying to the outside.

Ampoules 1 of the kind described here can be provided in different sizes, for example with a receiving volume of 5 ml, 10 ml, 20 ml or 30 ml, the size of the ampoule body 10 being scaled accordingly, without its function and shape substantially changing.

Thus, in the case of an ampoule 1 with a nominal capacity of 20 ml, the overall height H of the ampoule body 10 (including the neck 100, see FIG. 7A) can be, for example, between 40 and 60 mm, preferably ca. 51.6 mm. The neck length H1 can in this case be ca. 9.5 mm. The maximum breadth D can be, for example, between 15 and 25 mm, for example ca. 20.5 mm, while the ampoule width E (see FIG. 7C) is between 35 and 45 mm, for example ca. 38.4 mm. The flattening 104 can have a width E1 of between 5 and 15 mm, for example 8.0 mm. This results in an at least approximately elliptic shape of the ampoule body 10 in the cross section according to FIG. 7C, which shape can be described by a ratio of the ampoule breadth D to the ampoule width E. The ratio D/E can be, for example, in a range between 0.33 and 0.7, for example ca. 0.53.

The wall thickness W1 (see FIG. 7A) of the walls of the ampoule body 10 can be, for example, between 0.2 and 0.5 mm, for example 0.3 mm. The ampoule body 10 also has a corresponding wall thickness W2 in its transition area to the base 12, while the wall thickness W3 at the base 12 can increase toward the center of the base. At the center of the base, the wall thickness W3 can be, for example, between 0.3 and 0.7 mm, for example ca. 0.5 mm. The height B of the center of the base above the outer ring of the ampoule body 10 can be, for example, between 1 and 2 mm, e.g. 1.6 mm.

For ampoules 1 with another nominal capacity, the values can be scaled accordingly. In the tables below, this is shown by way of example for ampoules 1 with a nominal capacity of 20 ml, 10 ml and 5 ml. The ratio of ampoule breadth D to ampoule width E is approximately constant.

| Nominal capacity | Height H [mm] | Neck length H1 [mm] | Breadth D [mm] | Width E [mm] | Width of flattening E1 [mm] | Ratio D/E |
|---|---|---|---|---|---|---|
| 20 ml | 40-60, e.g. 51.6 | 9.5 | 15-25, e.g. 20.5 | 35-45, e.g. 38.4 | 5-15, e.g. 8.0 | 0.33-0.7, e.g. 0.53 |
| 10 ml | 30-50, e.g. 42.7 | 9.5 | 10-20, e.g. 16.6 | 25-35, e.g. 31.2 | 2-12, e.g. 6.5 | 0.3-0.8, e.g. 0.53 |
| 5 ml | 25-45, e.g. 37.1 | 9.5 | 5-15, e.g. 12.8 | 20-30, e.g. 24.0 | 2-8, e.g. 5.0 | 0.2-0.8, e.g. 0.53 |

| Nominal capacity | Wall thickness W1 [mm] | Wall thickness W2 [mm] | Wall thickness W3 [mm] | Height B [mm] |
|---|---|---|---|---|
| 20 ml | 0.2-0.5, e.g. 0.3 | 0.2-0.5, e.g. 0.3 | 0.3-0.7, e.g. 0.5 | 1-2, e.g. 1.6 |
| 10 ml | 0.2-0.5, e.g. 0.3 | 0.2-0.5, e.g. 0.3 | 0.3-0.7, e.g. 0.5 | 0.8-1.8, e.g. 1.3 |
| 5 ml | 0.2-0.5, e.g. 0.3 | 0.2-0.5, e.g. 0.3 | 0.3-0.7, e.g. 0.5 | 0.5-1.5, e.g. 1.0 |

The ampoule body 10 has a basic shape which is substantially elliptic in cross section and of which the ratio of breadth D to width E is not equal to 1 and in particular is at least approximately constant independently of the nominal capacity.

Figure 2:
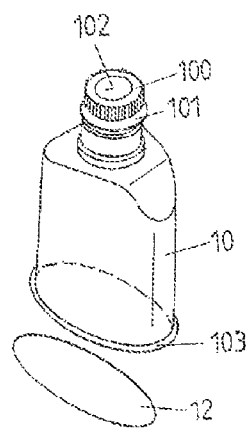
FIG. 2 shows a view of the ampoule body with a base element in the form of a film.

If an outwardly protruding stand ring 103 is present, for example as in the illustrative embodiment according to FIGS. 1 to 3, it can jut out, for example, by between 0.5 and 1.5 mm, for example by 0.7 mm. Together with a wall thickness W1 of ca. 0.3 mm, a stand ring with a breadth of ca. 1 mm, for example, is created, which permits a secure stand and, if appropriate, reliable welding of a film-shaped base element 12.

The underlying concept of the invention is not limited to the illustrative embodiments described above and can instead be implemented quite differently.

The connection part does not have to be designed as a Luer attachment for a Luer lock connection. In principle, connection parts for other types of connection are also possible and conceivable.

The ampoule body and also the connection part and the base element can in principle also be made from materials other than those mentioned in this text. To this extent, all materials can be used that are suitable for designing a container for medical liquids.

After the ampoule body has been filled, and after the connection part or if appropriate a suitable base element has been fitted, the ampoule can be sterilized. This can be done, for example, at temperatures in excess of 100° C., for example at 121° C., with the ampoule closed.

LIST OF REFERENCE SIGNS 1 ampoule
10 ampoule body
100 neck
101 locking projection
102 opening
103 stand ring
104 central portion or flattening
105, 106 end
107, 108, 109 shoulder
11 connection part
110 break-off piece 111 attachment piece
112 threaded segment
113 thread turns
114, 115 indicator element
116 grip limiter
117 predetermined breaking point
118 contact portion
119 locking recess
12 base element
13 membrane element
130 opening
2 removal device (syringe)
20 connection element
200 thread grooves
21 syringe cone
22 syringe body
23 plunger
A attachment direction
B base height
D ampoule breadth
E ampoule width
E1 width
H height
H1 neck length
W1, W2, W3 wall thickness

The invention claimed is:

1. An ampoule for a medical liquid, comprising:
an ampoule body for receiving the medical liquid, wherein the ampoule body is produced by injection-molding a plastic,
a connection part for connecting a removal device to the ampoule,
a membrane disposed between the ampoule body and the connection part,
wherein the ampoule is of a multi-part construction, with the connection part being joined as a separate part to the ampoule body, with the connection part being held with a form fit on a neck of the ampoule body, and the membrane is configured to seal a transition between the ampoule body and the connection part.

2. The ampoule according to claim 1, wherein said connection part comprises:
a break-off piece, and
a threaded segment connected to the break-off piece, wherein said threaded segment comprises a thread turn that produces a threaded connection to said removal device,
wherein, in a first state said break-off piece connects to said threaded segment and closes an opening and said ampoule body, and in a second state said break-off piece frees said opening and is removable from said threaded segment.

3. The ampoule according to claim 2, further comprising a piece, wherein said threaded segment and said break-off piece are regions of said piece, wherein said piece comprises a predetermined breaking-point for breaking said break-off piece from said threaded segment, and wherein said predetermined breaking-point is between said threaded segment and said break-off piece.

4. The ampoule according to claim 1, wherein the ampoule body has a flexibility that is selected such that said ampoule body collapses when medical liquid is removed therefrom.

5. The ampoule according to one of claim 1, wherein the ampoule body includes:
a side that faces away from the connection part, and
a base element and a cohesively-bonded connection, wherein the base element is separate from the ampoule body and the cohesively-bonded connection joins the base element to the ampoule body on the side.

6. The ampoule according to claim 5, wherein the base element is in the form of a film and the ampoule further comprises an adhesive bond that connects said film to said ampoule body.

7. The ampoule according to claim 5, wherein the base element is in the form of a film and the ampoule further comprises a weld that connects said film to said ampoule body.

8. The ampoule according to claim 1, further comprising, on a side of the ampoule body that faces away from the connection part, a base element that is produced in one piece with the ampoule body using plastic injection molding.

9. The ampoule according to one of claim 8, wherein the base element arches into the ampoule body.

10. The ampoule according to claim 1, wherein the ampoule body comprises a side that faces away from said connection part and wherein the ampoule further comprises a stand ring that protrudes from the ampoule body.

11. The ampoule according to claim 1, wherein the ampoule body comprises a coating, in particular for providing an oxygen barrier.

12. The ampoule according to claim 1, wherein the ampoule body comprises an oxygen barrier.

13. The ampoule according to claim 1, wherein said ampoule body has a cross section, wherein said cross section is transverse to an attachment direction along which said connection part joins said ampoule body, wherein said cross section has a central portion, a first end portion, and a second end portion, wherein said central portion has a maximum ampoule breadth, wherein said ampoule breadth, starting from said central portion, narrows with increasing distance from said central portion and wherein said ampoule breadth, starting from said first end portion, increases with decreasing distance from said central portion and wherein said ampoule breadth, starting from said second portion, increases with decreasing distance from said central portion.

14. The ampoule according to claim 1, wherein said ampoule body comprises a transition area, wherein said transition area transitions into said neck, wherein said transition area comprises first and second beveled shoulders that oppose each other.

15. The ampoule according to claim 1, wherein, in a central portion of said ampoule body, two opposing sides of said ampoule body, which define an ampoule width, each comprise a straight portion.

16. A method comprising producing a manufacture that comprises a membrane and an ampoule that receives a medical liquid and that comprises an ampoule body and a connection part that connects said ampoule to a removal device, said ampoule being a constituent of a multi-part construction, wherein producing said manufacture comprises injection molding a plastic to form said ampoule body and joining said connection part as a separate part to said ampoule body, wherein joining said connection part comprises causing said connection part to be held with a form fit on a neck of said ampoule body, and causing said membrane to seal a transition between said ampoule body and said connection part and causing said membrane to seal a transition between said ampoule body and said connection part.

* * * * *